United States Patent [19]

Keeney, Jr.

[11] 3,757,230
[45] Sept. 4, 1973

[54] COSINUSOIDAL PULSE GENERATOR WITH INTEGRATOR STAGE

[75] Inventor: Marvin F. Keeney, Jr., Springfield, Pa.

[73] Assignee: General Electric Company, Philadelphia, Pa.

[22] Filed: Jan. 14, 1972

[21] Appl. No.: 217,913

[52] U.S. Cl. ............... 328/28, 307/235 R, 307/261, 307/262, 328/63, 328/155
[51] Int. Cl. ............................................. H03k 5/08
[58] Field of Search ............ 307/235, 252 N, 252 Q, 307/261, 262, 269, 293; 328/28, 29, 63, 127, 155

[56] References Cited
UNITED STATES PATENTS

| | | | |
|---|---|---|---|
| 3,594,649 | 7/1971 | Rauch | 328/127 X |
| 3,555,304 | 1/1971 | Magee | 307/269 X |
| 3,619,653 | 11/1971 | Poppinger et al. | 307/269 X |

*Primary Examiner*—John Zazworsky
*Attorney*—J. Wesley Haubner and Albert S. Richardson, Jr.

[57] ABSTRACT

A pulse generator for developing firing pulses for at least one controlled rectifier located between a source of single or polyphase alternating current and a load. The pulse generator comprises at least one bipolar active integrator which integrates a replica of an alternating source signal. The resulting integrated signal is compared with a control signal in a comparator circuit of the pulse generator and when a preselected relationship exists between the integrated signal and the control signal, the comparator circuit generates a firing pulse which may be utilized to trigger the controlled rectifier.

11 Claims, 4 Drawing Figures

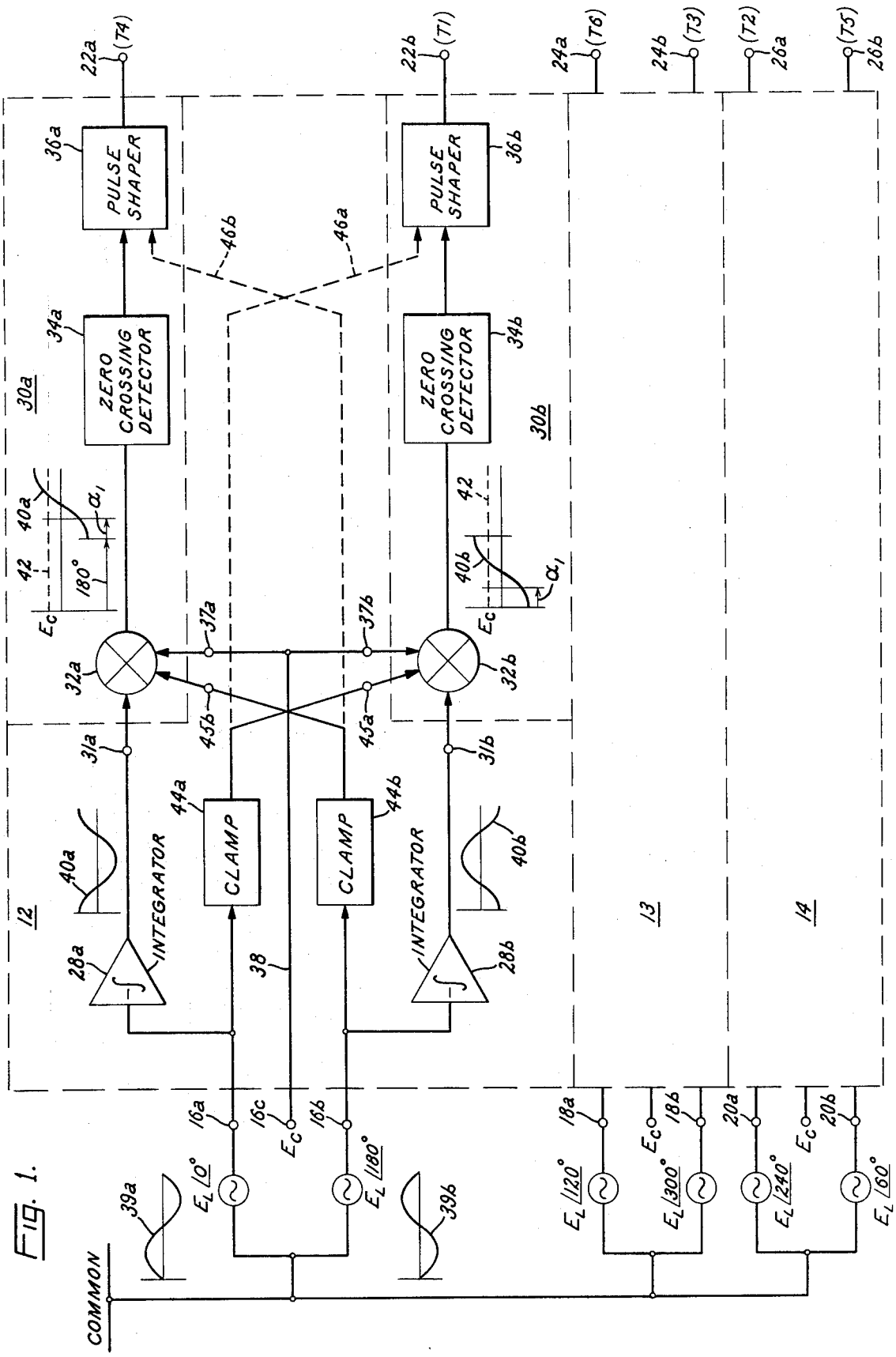

COSINUSOIDAL PULSE GENERATOR WITH INTEGRATOR STAGE

BACKGROUND OF THE INVENTION

This invention relates to firing circuits for controlled rectifiers. When controlled rectifiers are interconnected and arranged to form an a-c switch or a rectifier bridge and are operated in a phase control mode, the delivery of electric power from a source of alternating voltage (single phase or polyphase) to a connected load can be controlled. As is known by persons skilled in the art, the average voltage applied to the load is a function of the "firing angle" of the controlled rectifiers. This angle is the point in the forward anode voltage cycle at which the firing circuit generates a gate pulse to turn on the rectifier. "Biased cosine" pulse generators have been used for this purpose. In such a generator a sine wave supply voltage is retarded as nearly as possible by 90 electrical degrees and compared with a bipolarity d-c control voltage. Periodically, at those cyclically recurring moments when the magnitude of the algebraic sum of the retarded voltage and the control voltage crosses zero, firing pulses are generated for triggering the controlled rectifiers. The value of the control signal therefore determines the firing angle.

The prior art, as for example illustrated by U.S. Pat. No. 3,095,513-Lezan, employs a passive integrator network to provide approximately a 90° phase shift in an alternating signal. The total phase shift is obtained in two stages: a 30° phase lag is introduced by appropriate interconnections of transformer coils, and an additional phase shift of approximately 60° is tacked on by means of a passive integrator comprising a capacitive-resistive network. When properly designed and adjusted, the passive integrator operates accurately so long as the source frequency is the same as that for whice it was designed. However, because the phase shifting characteristic of the passive integrator is sensitive to relatively small variations in the parameters of its components and in the associated load, special care has heretofore been necessary to individually adjust each pulse generator for proper operation. Furthermore, if such a prior art circuit is designed to operate at a frequency of 60 Hz., for example, it will not function properly at other source frequencies such as the standrad European frequency of 50 Hz. or the standard military frequency of 400 Hz.

In another prior art cosinusoidal pulse generating circuit, the 90° phase shifting function is accomplished by a Miller integrator which is unipolar in response and therefore needs to be periodically reset for proper operation. The resetting circuitry detracts from the desired reliability, size, and cost of the firing circuit.

The present invention provides a solid state cosinusoidal pulse generating circuit for controlled rectifiers which is characterized by relatively low cost and small size, and it is particularly well suited for fabrication as an integrated circuit. In addition, the cosinusoidal pulse generator described herein can operate over a wide range of frequencies without requiring different components or parameters for each frequency, and its operating characteristic is relatively insensitive to variations in the energy drained from its phase shifting means. The present invention provides a further improvement by eliminating the need for individual adjustments and for reset circuitry.

SUMMARY OF THE INVENTION

In one preferred form, the present invention comprises an improved cosinusoidal pulse generator utilizing a bipolar active integrator and developing timely firing pulses which may be used to trigger at least one controlled rectifier which is located between a source of alternating voltage and a load. An a-c input signal which is a replica of the source voltage is applied to the bipolar active integrator of the pulse generator, and the integrator generates a cosinusoidal reference signal which is nearly 90° out-of-phase with the a-c input signal. The pulse generator further comprises a comparator circuit to which the reference signal is supplied. A control signal is also supplied to the comparator circuit, and the comparator circuit operates to generate an output signal or firing pulse when a preselected relationship exists between the reference signal and the control signal.

It is a general object of the present invention to provide an improved, quiet, small, economical, cosinusoidal pulse generator which generates a train of periodic firing pulses which may be utilized for cyclically triggering controlled rectifiers.

Further objects and advantages of the invention will be apparent to those skilled in the art, from the following description of the invention, taken in conjunction with the attached drawings in which:

FIG. 1 is a block diagram of an embodiment of the invention;

DESCRIPTION OF THE PREFERRED EMBODIMENTS

Figure 1A:
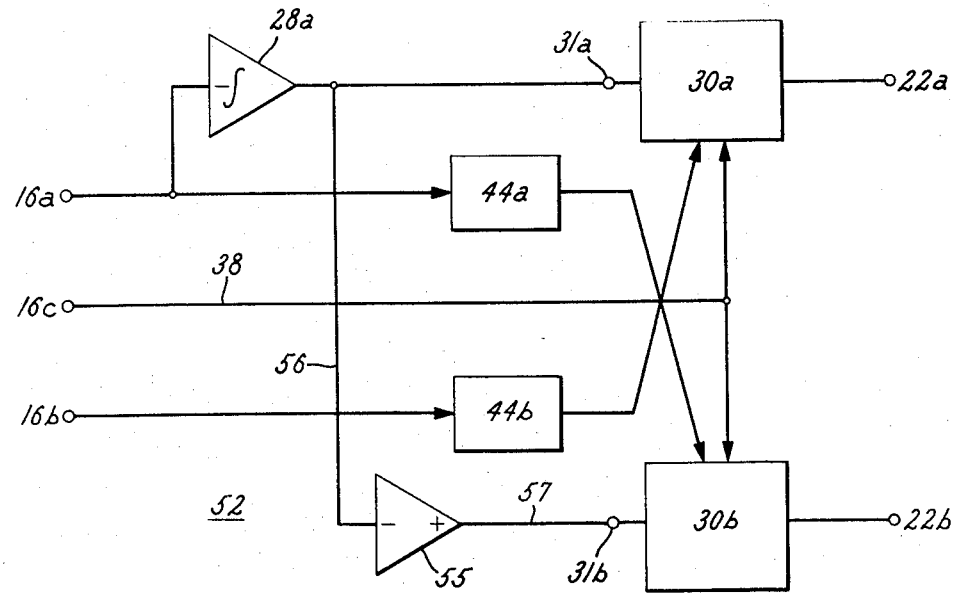
FIG. 1A is a block diagram of a modification of the FIG. 1 embodiment.

Referring to the drawings, FIG. 1 shows three cosinusoidal pulse generators 12, 13, and 14 which receive a-c signals at their respective input terminals 16a, 16b, 18a, 18b, 20a, and 20b and generate trains of periodic firing pulses at their respective output terminals 22a, 22b, 24a, 24b, 26a, and 26b. The a-c input signals energizing the input terminals have sinusoidal wave forms, and they are typically derived from a 3-phase source of alternating voltage. They are respectively representative of the forward anode voltages on six controlled rectifiers which are intended to be sequentially fired, at 60° intervals, during each cycle of the source voltage. Each of these signals is designated $E_L$, with the first phase ($E_L/0°$) applied across the set of terminals consisting of 16a and common, the second phase ($E_L/120°$) applied across the set of terminals 18a and common, and the third phase ($E_L/240°$) applied across the set of input terminals 20a and common. The remaining sets of input terminals are energized by a-c signals (designated as $E_L/180°$, $E_L/300°$, and $E_L/60°$, respectively) which are just 180° out-of-phase with respect to the first three phases as shown. If desired, the latter signals may be obtained from standard integrated circuit analog inverters coupled one to each of the lines from which the replicas of the original voltages are obtained.

Figure 2:
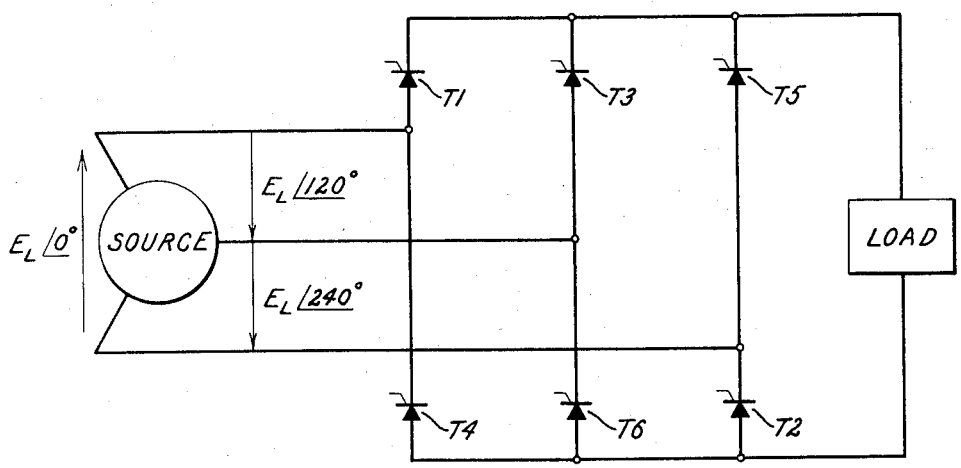
FIG. 2 is a schematic diagram of a power circuit including a conventional rectifier bridge whose individual branches comprise controlled rectifiers which can be triggered by the firing circuit shown in FIG. 1.

The output terminals 22a, 22b, 24a, 24b, 26a, and 26b are respectively coupled to the control electrodes or gating means of a plurality of controlled rectifiers T4, T1, T6, T3, T2, and T5 which form a 3-phase double-way 6-pulse rectifier bridge as is shown by way of example in FIG. 2. This bridge has a pair of d-c terminals connected via a d-c bus to a block labeled "Load" and a set of a-c terminals connected to a 3-phase a-c system labeled "Source." The six controlled rectifiers T1–T6 are cyclically triggered in numerical sequence by the firing signals which the pulse generators 12, 13, 14 supply to their respective gates. If desired, conventional amplification and isolation means can be included in the connections between the output terminals of the pulse generators and the gates of the associated controlled rectifiers. In a manner that will soon be explained, these firing signals are generated in synchronism with the alternating voltage of the a-c system but at a firing angle "alpha" that can be varied over a wide range (e.g., 4° to 173°).

It will be obvious to one skilled in the art that there are numerous circuit variations of controlled rectifiers that can be advantageously triggered by cosinusoidal pulse generators embodying the present invention. For example, the complementary rectifier pairs (T1, T4; T3, T6; and T5, T2) could alternatively be arranged to form a-c switches between the illustrated source and a 3-phase a-c load. It should also be noted that the source and load labels in FIG. 2 could be interchanged, and that the present invention may be used with either signal phase or polyphase a-c input signals and is not limited to use with the 3-phase source that is shown in its preferred embodiment. The term "controlled rectifier" as used herein is intended to be generic to SCR's, thyristors, thyratrons and the like, used either individually or in multiple arrays that are designed to operate in unison.

The cosinusoidal pulse generators 12, 13 and 14 are all identical and therefore only generator 12 associated with the first phase of the 3-phase system is shown and described in detail. This generator includes two bipolar active integrators 28a and 28b, two comparator circuits 30a and 30b and two clamps 44a and 44b. The input of the first bipolar active integrator 28a is connected to input terminal 16a, and the input of the second bipolar active integrator 28b is connected to input terminal 16b. Throughout this specification, the term bipolar active integrator refers to integrators comprising at least one active element such as a transistor or vacuum tube and capable of continuously integrating input signals of either positive or negative polarity with respect to common. An operational integrator which is an example of a bipolar active integrator is described on page 17 of the 1965 edition of *Pulse, Digital, and Switching Waveforms* by J. Millman and H. Taub and published by McGraw-Hill of New York. The operational integrator is there shown to comprise, basically, a capacitor connected in parallel with an operational amplifier. Thus the bipolar active integrators 28a and 28b will produce at their outputs undulating signals (referred to hereinafter as the first and second reference signals, respectively) which are time integrals of the a-c input signals $E_L/0°$ and $E_L/180°$. In the illustrated embodiment, each integrator operates to provide a negative integral of its input signal, as is explained by Millman and Taub. In any event, both the first and the second reference signals (40a and 40b) that the integrators produce are cosine functions of the respective input signals, and the latter is seen to be 180° out-of-phase with respect to the former.

The output of first integrator 28a is connected to a first input 31a of comparator 30a, whereby the first reference signal 40a is communicated or supplied to that input. The output of second integrator 28b is similarly connected to a first input 31b of another compartment 30b. The comparator circuits 30a and 30b of generator 12 include respective second inputs 37a and 37b and output terminals 22a and 22b. The comparator 30a is periodically operative to produce an output signal or firing pulse at its output terminal 22a when a preselected recurrent relationship exists between the various signals that are supplied to the respective input terminals thereof. Comparator 30b operates in the same manner. Although other suitable circuits may be employed for this purpose, the comparators 30a and 30b disclosed in FIG. 1 are seen to include respective summing networks 32a and 32b, zero crossing detectors 34a and 34b, and pulse shapers 36a and 36b.

The second inputs 37a and 37b of both comparators are connected to one set of the pulse generator input terminals (16c and common) which set is adapted to be energized by a bipolarity d-c control signal $E_c$ of variable magnitude. As will soon be apparent from the description of the operation of the pulse generator 12, the firing angle $\alpha$ of the ultimate output pulses of this generator is determined by the value of $E_c$. When $E_c$ is zero, $\alpha = 90°$. When $E_c$ is at its maximum positive level, $\alpha$ is fully advanced (approximately 4°), and when it is maximum negative level, $\alpha$ is fully retarded (approximately 173°).

In the embodiment shown in FIG. 1, clamps 44a and 44b are employed to selectively transmit an advance limit signal to a third input of each of the comparators 30a and 30b in order periodically to disable the same. Clamps 44a and 44b have their respective inputs connected to input terminals 16a and 16b. The output of clamp 44a is connected to an input terminal 45a of the summing network 32b, and the output of clamp 44b is connected to an input terminal 45b of summing network 32a. In an alternative embodiment of the present invention, the output of clamp 44a may be connected by line 46a to a second input of pulse shaper 36b and the output of clamp 44b may be similarly connected by line 46b to pulse shaper 36a in lieu of the previously described connections to 45a and 45b.

In operation, the a-c input signal $E_L/0°$ (represented by curve 39a in FIG. 1) is applied to the input of bipolar active integrator 28a which produces a first reference signal (40a) proportional to the negative integral thereof. This reference signal is supplied to the first input terminal 31a of comparator circuit 30a where it is combined at summing network 32a with the control signal $E_c$. The zero crossing detector 34a responds to the algebraic sum of all signals supplied to the summing network and produces a pulse signal at its output whenever the magnitude of this sum crosses zero in a positive-going sense. Assuming the control signal $E_c$ has a predetermined relatively positive magnitude represented by trace 42 in FIG. 1, and further assuming there is no limit signal from the clamp 44b, the pertinent zero crossing is reached at angle $\alpha_1$ in the half cycle of the a-c input voltage which corresponds to forward anode voltage on the controlled rectifier T4. If $E_c$ were zero, this event would occur later in the cycle, at a firing angle of approximately 90°. The resulting pulse signal at the output of the zero crossing detector 34a is communicated to the input of pulse shaper 36a, and each time it is produced the pulse shaper 36a generates a discrete pulse of desired amplitude and duration at output terminal 22a. This output pulse is used to initiate firing of the controlled rectifier T4.

Clamp 44b is used to disable comparator 30a during a selected portion of each cycle of the a-c input signal, thereby preventing the production of any firing pulse in advance of a predetermined minimum firing angle. In the embodiment shown in FIG. 1, clamp 44b receives the a-c input signal $E_L 180°$ from input terminal 16b. During relatively positive half cycles of this signal, no limit signal is supplied by the clamp 44b to the input 45b of the summing network 32a. But throughout each negative half cycle the clamp is arranged to supply a limit signal which has sufficient negative magnitude to ensure that the algebraic sum of all three signals at 32a cannot become positive. The expiration of this limit signal thus marks the earliest point in a cycle that a firing pulse can be produced even if, in advance thereof, the sum of the reference signal 40a and the control signal 42 were to cross zero in a positive going sense.

In an alternative embodiment as hereinbefore described, comparator circuit 30a may be disabled by applying a suitable limit signal from clamp 44b over line 46b to an input of pulse shaper 36a. In this alternative embodiment, the pulse shaper that is used would perform an AND logic function, not responding to any pulse signal received from zero crossing detector 34a unless or until the periodic advance limit signal from clamp 44b has terminated.

Bipolar active integrator 28b, zero crossing detector 34b, pulse shaper 36b and clamp 44a operate in the same manner as, but one-half cycle earlier, than the bipolar active integrator 28a, zero crossing detector 34a, pulse shaper 36a and clamp 44b just described. That is to say, bipolar active integrator 28b receives the a-c input signal $E_L/180°$ from input terminal 16b and produces at terminal 31b the second reference signal (40b) which is the negative integral of $E_L/180°$. Hence the wave form of the second reference signal is the cosine function of $E_L/0°$ with inverted polarity. This signal, the control signal $E_c$, and an advance limit signal from clamp 44a are all supplied to the summing network 32b which provides an input for zero crossing detector 34b of the comparator 30b. Unless the comparator 30b is disabled by a limit signal from clamp 44a, a firing pulse is generated at output terminal 22b whenever the magnitude of the algebraic sum of the reference and the control signals crosses zero in a positive going sense. In the example shown in FIG. 1, this occurs just 180° before the complementary firing pulse is generated by the companion comparator 30a, and the firing angle for controlled rectifier T1 is $\alpha_1$ as before.

Clamp 44a is driven by input signal $E_L/0°$ and provides a limit signal to comparator circuit 30b during the relatively negative portion of each cycle of this input signal. Therefore, comparator circuit 30b is able to operate only during alternate half cycles with respect to comparator 30a.

FIG. 1A is a block diagram of an alternative embodiment of the present invention as utilized in the pulse generator 12. Here the cosinusoidal pulse generator 52 receives the same a-c input signals as before at its input terminals 16a and 16b and the same bipolarity d-c control signal at its input terminal 16c. The cosinusoidal pulse generator 52 likewise generates first and second trains of alternate firing pulses at its respective output terminals 22a and 22b, with the firing angle of these pulses being determined by the value of the control signal. As is indicated in FIG. 1A, most of the component parts of the cosinusoidal pulse generator 52 are identical to those contained in pulse generator 12. Pulse generator 52 is primarily different from pulse generator 12 in that the former does not employ a second bipolar active integrator 28b but rather employs a polarity inverter 55. Inverter 55 is connected between the first integrator 28a and the first input 31b of the comparator 30b for supplying to the latter a second reference signal which is the polarity-inverted image of the first reference signal (40a in FIG. 1). That is, the second reference signal communicated by line 57 to input terminal 31b of comparator 30b in FIG. 1A is just 180° out-of-phase with respect to the reference signal produced by the integrator 28a and is therefore identical to the output (40b) from the integrator 28b of FIG. 1. The construction and operation of the comparators 30a and 30b in FIG. 1A are the same as previously described with reference to FIg. 1.

It should be apparent to one skilled in the art that further embodiments of which present invention may include substituting for the combination of integrator 28a and inverter 55 a bipolar active integrator suitably designed to generate a positive time integral of the a-c input signal $E_L/0°$ which integral would have the desired negative cosine wave form for the input 31b of comparator 30b. The same integral could be fed to means for inverting its polarity, thereby producing the proper reference signal for the input terminal 31a of the companion comparator 30a.

Figure 3:
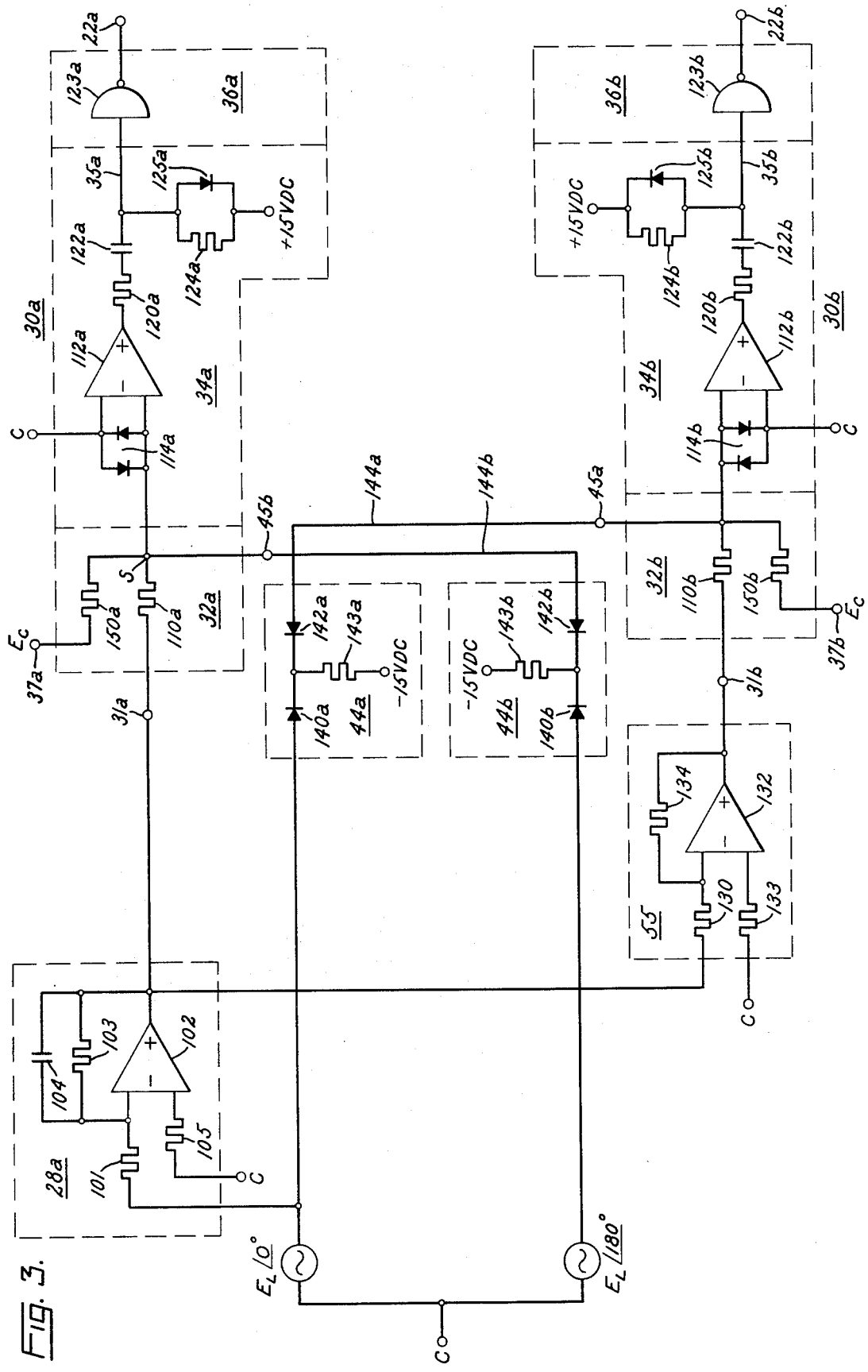
FIG. 3 is a schematic diagram of circuit components and interconnections that can be used to implement the embodiment of the invention shown functionally in FIG. 1A.

FIG. 3 is a schematic circuit diagram of the presently preferred embodiment of the invention. Bipolar active integrator 28a, inverter 55, clamps 44a and 44b, and comparators 30a and 30b correspond to the similarly numbered components FIG. 1A.

In particular, in the bipolar active integrator 28a the a-c input signal $E_L/0°$ is fed through resistor 101 to an operational amplifier 102. Bipolar active integrator 28a also includes a resistor 103 in parallel with a capacitor 104 which resistor 103 and capacitor 104 are shunted across a first input terminal and an output terminal of operational amplifier 102. A second input terminal of operational amplifier 102 is connected through a resistor 105 to a common point (e.g., ground) designated as C. The bipolar active integrator 28a is of a variety generally known as an operational integrator and operates to produce at its output a reference signal which is the negative of the time integral of its input signal. Since commercially available forms of this integrator may have a phase-shift characteristic slightly less than 90°, in practice it is desirable to introduce a slightly lagging phase shift in the a-c input signal with respect to the relevant source voltage.

The reference signal produced by integrator 28a is communicated to the comparator 30a and to the inverter 55. In the comparator 30a it is supplied to the first input 31a of the summing network 32a. As is shown in FIG. 3, input terminal 31a is connected to a summing point S by way of a resistor 110a. The summing point S in turn is connected via an inverse parallel pair of diodes 114a to the common point C. Whether the potential of S with respect to C is positive or negative depends on the algebraic sum of the various signals supplied to the respective input terminals 31a, 37a, and 45b of the network 32a. The bipolarity d-c control signal $E_c$ is supplied to the second input 37a which is connected via a resistor 150a to the summing point S. The advance limit signal that the clamp 44b provides is communicated to the third input 45b by line 144b.

In FIG. 3 the clamp 45b is seen to comprise a relatively negative d-c supply voltage bus (−15VDC) connected to the line 144b via a resistor 143b in series with a diode 142b which is poled to conduct current from the summing point S to the negative bus. The juncture of the resistor 143b and diode 142b is connected to the cathode of a second diode 140b whose anode is energized by the a-c input signal $E_L/180°$. The parameters are chosen so that throughout each positive half cycle of this a-c signal the diode 140b will conduct and the drop across resistor 143b will exceed 15 volts, whereby the diode 142b is back biased and there is consequently no limit signal at the input terminal 45b of the summing network. On the other hand, during negative half cycles of the same a-c signal, the diode 140b is non-conducting and the diode 142b is able to conduct current which will flow from the common point C, through the left-hand diode in pair 114a, out of the summing point S and the terminal 45b, through line 144b, and through resistor 143b to the negative bus. This is the previously mentioned advance limit signal that ensures that the polarity at S remains negative with respect to C even if the algebraic sum of the signals supplied to the other two input terminals 31a and 37a of the comparator 30a were to cross zero in a positive going sense.

In the zero crossing detector 34a of comparator 30a, bistable means comprising an operational amplifier 112a is supplied with the voltage across the diode pair 114a and is responsive to the relative polarity of the summing point S. So long as S is negative with respect to C, the bistable means is in a first state in which its output is relatively positive (e.g., +15 volts). Whenever S is positive with respect to C, this means will be in its second state in which its output is relatively negative (e.g., −15 volts). In effect, 112a amplifies and inverts the polarity of the voltage across the diode pair 114a.

The output of the bistable means 112a and the output line 35a of the zero crossing detector 34a are interconnected by pulse forming means comprising a resistor 120a in series with a capacitor 122a. The line 35a will be normally maintained at a positive potential of approximately 15 volts with respect to the common point C by a resistor 124a which connects it to a relatively positive d-c supply voltage bus. The resistor 124a is shunted by a diode 125a which is poled to prevent the potential on line 35a from ever becoming appreciably more positive than +15 volts.

The output line 35a of zero crossing detector 34a is connected to the pulse shaper 36a which comprises a level detecting NAND gate 123a. The output of NAND gate 123a is connected to output terminal 22a of the comparator 30a. The NAND gate in this embodiment is a device which exhibits no output signal so long as there is applied to its input a relatively positive signal whose magnitude exceeds a predetermined low level (e.g., 7.5 volts) and which generates an output signal of desired amplitude whenver the input signal is not more positive than that level. Consequently the existence and duration of each output pulse generated by the pulse shaper 36a correspond to the intervals that the potential on line 35a is reduced below (less positive than) said predetermined level.

As is shown in FIG. 3, the components and circuits used in the companion comparator 30b are essentially the same as those just described for comparator 30a, and they have been correspondingly numbered. However, in this case an inverter 55 is disposed between the input terminal 31b and the bipolar active integrator 28a. In the inverter 55, a resistor 130 has one end connected to the output of integrator 28a and the other end connected to a first input terminal of an operational amplifier 132. A second resistor 133 is connected between a second input terminal of operational amplifier 132 and common point C. A resistor 134 is shown shunted across the first input terminal of operational amplifier 132. Resistors 130, 133 and 134 bias the operational amplifier in a manner such that it operates as a unity gain inverter. The output of operational amplifier 132 is therefore an inverter image of the reference signal produced by the integrator 28a.

The operation of the comparator 30a shown in FIG. 3 will now be briefly reviewed. When the polarity of the algebraic sum of the control signal applied to terminal 37a, the reference signal applied to terminal 31a, and the limit signal at terminal 45b is negative with respect to the common point C, the operational amplifier 112a will be in its first state, the capacitor 122a will be discharged, and a positive bias of 15 volts will be present on line 35a. As soon as the value of this sum passes from negative to positive (i.e., crosses zero in a positive-going sense), the operational amplifier 112a abruptly changes states (from +15V to −15V) and contemporaneously therewith the potential on line 35a is reduced to zero or driven negatively with respect to C. The capacitor 122a immediately starts to charge, and the potential on line 35a then begins rising and utlimately returns to +15 volts. The pulse shaper 123a generates its discrete output signal during the interval that this potential remains less positive than the aforesaid predetermined level. Thus the width of the output pulse will depend on the time constant of the charging circuit for capacitor 122a. Typically it is within the range of 10 to 150 microseconds. It will be noted that the diode 125a prevents any positive-going spike of voltage on line 35a upon the occasion of the operational amplifier 112a changing from its second state to its first state (from −15V to +15V output) when the potential at the summing point S next goes negative.

In one practical embodiment of the invention, discrete circuit components were used for its various functional parts. By way of example, the operational amplifiers 102, 132, 112a, and 112b were Motorola type MC1437L, and the NAND gates 123a and 123b were Motorola type MC672L. The capacitance of capacitor 122a was 0.068 microfarads, and the resistance of each of the resistors 120a and 124a was 2,200 ohms. Instead of using discrete components, a fully integrated circuit form of the cosinusoidal pulse generator can readily be made.

It will be understood that various changes may be made in details of the illustrative embodiments without departing from the spirit of the invention. It is therefore to be understood that the invention is not to be limited to the specific details shown and described above.

What is claimed as new and desired to be secured by Letters Patent of the United States is:

1. In a circuit for generating a train of periodic output pulses:
   a. first and second sets of input terminals adapted to be energized, respectively, by an a-c signal and by a separate bipolarity d-c control signal of variable magnitude;
   b. a bipolar active integrator connected to said first set of input terminals for producing a first reference signal which is the time integral of said a-c signal;
   c. a comparator having at least first and second inputs and an output;
   d. means connected between said integrator and said first input of said comparator for communicating said reference signal to said first input; and
   e. means connected between said second set of input terminals and said second input of said comparator for communicating said control signal to said second input;
   f. said comparator being periodically operative in response to a preselected recurrent relationship between the signals supplied to its respective inputs to generate output pulses at said output.

2. The circuit as claimed in claim 1 wherein said a-c signal is an alternating voltage having a sinusoidal wave form, said a-c control signal is a bipolar voltage of variable magnitude, and said comparator is adapted to generate an output pulse each time the algebraic sum of said alternating voltage and said bipolar voltage attains a predetermined value.

3. In a circuit for generating a train of periodic output pulses:
   a. first and second sets of input terminals adapted to be energized, respectively, by an a-c signal and by a control signal;
   b. a bipolar active integrator connected to said first set of input, terminals for producing a first reference signal which is the time integral of said a-c signal;
   c. a comparator having at least first and second inputs and an output;
   d. means connected between said integrator and said first input of said comparator for communicating said reference signal to said first input;
   e. means connected between said second set of input terminals and said second input of said comparator for communicating the control signal to said second input;
   f. said comparator being periodically operative in response to a preselected recurrent relationship between the signals supplied to its respective inputs to generate output pulses at said output; and
   g. a clamp means connected to said comparator for disabling said comparator during a selected portion of each cycle of said a-c signal.

4. In a circuit for generating a train of periodic output pulses:
   a. first and second sets of input terminals adapted to be energized, respectively, by an a-c signal and by a control signal;
   b. a bipolar active integrator connected to said first set of input terminals for producing a first reference signal which is the time integral of said a-c signal;
   c. a comparator having at least first and second inputs and an output;
   d. means connected between said integrator and said first input of said comparator for inverting the polarity of said first reference signal and for supplying to said first input a second reference signal which is 180° out-of-phase with respect to said first reference signal; and
   e. means connected between said second set of input terminals and said second input of said comparator for communicating the control signal to said second input;
   f. said comparator being periodically operative in response to a preselected recurrent relationship between the signals supplied to its respective inputs to generate output pulses at said output.

5. In a circuit for generating a train of periodic output pulses:
   a. first and second sets of input terminals adapted to be energized, respectively, by an a-c signal and by a control signal;
   b. a bipolar active integrator connected to said first set of input terminals for producing a first reference signal which is the time integral of said a-c signal;
   c. a comparator comprising a pulse signal producing zero crossing detecting means having at least first and second inputs and a pulse shaper for generating a discrete output pulse of desired shape each time said zero crossing detecting means produces a pulse signal;
   d. means connected between said integrator and said first input of said zero crossing detecting means for communicating said reference signal to said first input; and
   e. means connected between said second set of input terminals and said second input of said zero crossing detecting means for communicating the control signal to said second input;
   f. said zero crossing detecting means being periodically operative to produce a pulse signal whenever the relative polarity of the algebraic sum of all signals supplied to its respective inputs changes in a predetermined sense.

6. The circuit as claimed in claim 5 wherein said zero crossing detecting means comprises: bistable means connected to all of the inputs of said comparator and responsive to the relative polarity of the algebraic sum of the various signals that are supplied thereto, said bistable means being in a first state when said sum has a predetermined polarity and being in a second state when said sum has the opposite polarity; and means connected to said bistable means for forming said pulse signal contemporaneously with the bistable means changing from said first state to said second state.

7. The circuit as claimed in claim 5 including a clamp means, connected to the zero crossing detecting means, for preventing the polarity of said sum from changing in said predetermined sense during a selected portion of each cycle of said a-c signal.

8. The circuit as claimed in claim 5 including a clamp means, connected to the pulse shaper, for disabling said pulse shaper during a selected portion of each cycle of said a-c signal.

9. In a circuit for cyclically generating first and second trains of alternate output pulses, the respective pulses in said trains being generated alternately and at a firing angle with respect to a predetermined sinusoidal signal that is determined by the value of a variable d-c control signal:
  a. a bipolar active integrator for producing a first reference signal which is the time integral of said sinusoidal signal;
  b. first and second comparators each having at least first and second inputs and an output;
  c. means connected between said integrator and the first input of said first comparator for communicating said first reference signal thereto;
  d. means including a polarity inverter connected between said integrator and the first input of said second comparator for communicating a second reference signal thereto, said second reference signal being the polarity-inverted image of said first reference signal; and
  e. means for communicating said d-c control signal to the second inputs of both of said comparators;
  f. each of said comparators being periodically operative in response to a preselected recurrent relationship between the signals supplied to its respective inputs to generate output pulses at the output thereof.

10. The circuit as claimed in claim 9 wherein each of said comparators is periodically operative in response to the magnitude of the algebraic sum of all signals supplied to its respective inputs crossing zero in a positive-going sense.

11. The circuit as claimed in claim 10 including clamp means for disabling said first comparator during a selected half of each cycle of said sinusoidal signal and for disabling said second comparator during the other half of the same cycle.

* * * * *